UNITED STATES PATENT OFFICE.

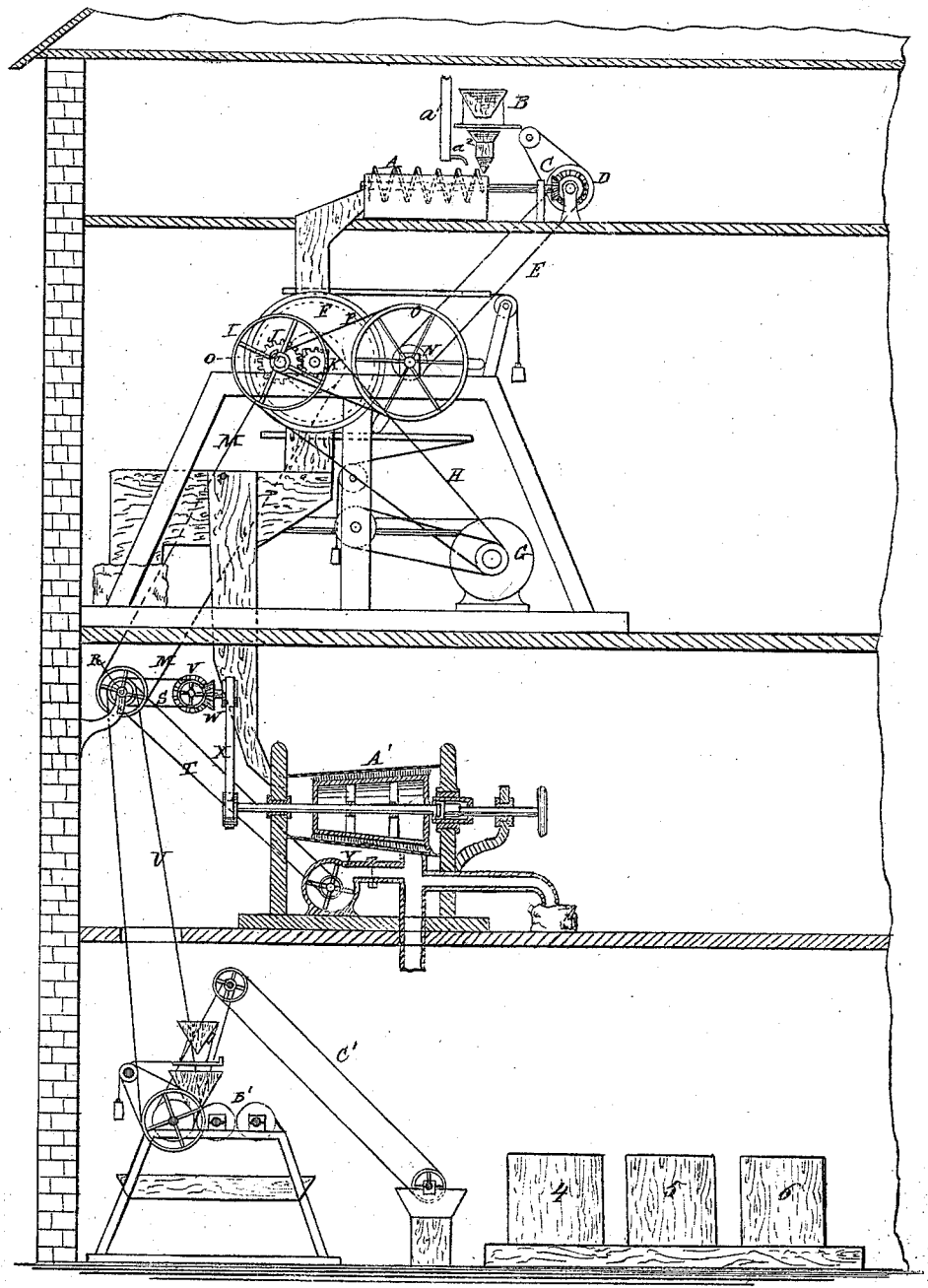

ALEXANDRE SÉZILLE, OF PARIS, FRANCE.

IMPROVEMENT IN PROCESSES OF TREATING GRAIN FOR THE MANUFACTURE OF BREAD.

Specification forming part of Letters Patent No. 134,443, dated December 31, 1872.

*To all whom it may concern:*

Be it known that I, ALEXANDRE SÉZILLE, of Paris, France, have invented a new and Improved Process of Treating Grain for the Manufacture of Bread without Grinding the Grain, of which the following is a specification:

The figure represents an apparatus for carrying my improved process into practical effect.

My invention has for its object to furnish a process for removing the epidermic pellicle, which is indigestible, and which constitutes but four or five per cent. of the grain, from the remaining parts, which parts, when mixed together, form the most complete alimentary substance for making bread; and it consists in the process of treating grain for the manufacture of bread without grinding the grain, as hereinafter more fully described.

Heretofore grain has been prepared for bread-making by grinding. This grinding allows but about eighty per cent. of the grain to be utilized, leaving twenty per cent. in bran and residuum. This eighty per cent. of flour, allowing a high yield of forty per cent. of white bread, produces one hundred and twelve kilograms of white bread out of one hundred kilograms of grain.

By my process, without grinding, I obtain a yield of from one hundred and forty-five to one hundred and fifty kilograms of white bread out of one hundred kilograms of grain—a yield exceeding the ordinary one by thirty-three per cent.

In carrying my process into practical effect I proceed as follows: I slightly wet the grain with two or three per cent., according to its dryness, of water heated to 30° or 40° centigrade. Steam may be employed if desired. This wetting is made mechanically and gradually as the grain is required for decortication. In three or four minutes after being moistened the pellicle of the grain expands and is ready for decortication, for which any suitable apparatus may be employed. The grain after being moistened should not stand more than fifteen minutes before being submitted to the decorticating process, as the dampness, instead of being confined to the pellicle, would begin to affect the bodies of the kernels and make the decortication more difficult. The grain when properly decorticated can be preserved for any desired length of time, to be afterward converted into paste, when required.

To remove the coloring matter of the grain, which is located directly under the epidermis, and which, upon fermentation, produces the brown bread, I steep the decorticated grain in a bath of water heated to 80° centigrade for half an hour, by which time the temperature of the water has fallen to 45° or 40°. The water is then decanted, and new water of the same temperature—viz., 45° or 40°, and no more—is put on the grain three or four times in the space of three or four hours. By this time the grain has absorbed enough water to be easily converted into paste, which is done by passing it twice through cylinders similar to those used by chocolate dealers. The paste thus obtained is ready for fermentation, and has then only to undergo the ordinary baking process to become good bread.

An excellent sea-biscuit can also be made by my process with great economy of raw material, hand-labor, and motive power. For this purpose it is sufficient to soak the decorticated grain for a shorter time, and to pass it two or three times under the cylinders, to obtain a paste which is firm, supple, and very ductile.

To manipulate the biscuit as to length and thickness, I propose using an apparatus similar to that employed in drawing drain-pipe. Forcing the paste through channels or holes made for that purpose would tend to make it more homogeneous, which is a desirable quality.

I will now briefly describe an apparatus for working my process. The building should be at least three stories high, so that the several parts of the apparatus may be upon different floors, to economize labor in passing the grain from one part of said apparatus to the other. Upon the top floor, upon which is stored the grain for the day's work, is placed an Archimedean screw A, surmounted by a hopper, B, in which the grain is placed, and both of which are actuated by gear-wheels C, and a pulley, D, driven by a belt, E. As the grain passes into the screw A it is moistened by water from a pipe, $a^1$, the escape of which is regulated by a stop-cock, $a^2$. From the screw A the moistened grain passes through a spout to the decorticator F, upon the floor below, where the most of the pellicle is removed. As the grain escapes from the decorticator F it is exposed to the blast of air from the fan-blower G, by which the pellicle is blown off into a receptacle. The fan-blower G is actuated by the belt H from the pulley I, and gear-wheel J, which meshes into the small gear-wheel K attached to the journal of the decorticator, said decorticator being itself actuated by the belt M. The little pulley Q, by means of the belt P, gives motion to the pulley O, which actuates the twin pulley N, around which passes the belt E that gives motion to the pulley D. From the decorticator F the grain passes to the brusher A', which is actuated by the belt X, gear-wheels W V, and belt S, from the main shaft R, which carries the various pulleys for receiving the belt M that drives the decorticator F, the belt S that drives the brusher A', the belt T that drives the ventilator Y, and the belt U that drives the cylinders. As the grain passes through the brusher A', any pellicle left by the decorticator F is removed, which pellicle is blown off by the blast from the fan-blower Y, as the said grain escapes from the said brusher.

B' are the cylinders, to which the soaked grain is carried by the elevator C', or by an Archimedean screw, as may be desired.

Upon the first floor are also placed the tubs or tanks 4 5 6 for soaking the grain, and the steam generator and engine to furnish the power.

Having thus described my invention, I claim as new and desire to secure by Letters Patent—

The process, herein described and set forth, for preparing grain without grinding, for making bread.

ALEXANDRE SÉZILLE.

Witnesses:
PIERRE JULES LECLERC,
MEYER LEOPOLD.